Aug. 14, 1934.                R. H. IRONS ET AL                1,969,885
                                HIGHWAY GUARD
                             Filed July 1, 1933          6 Sheets-Sheet 1
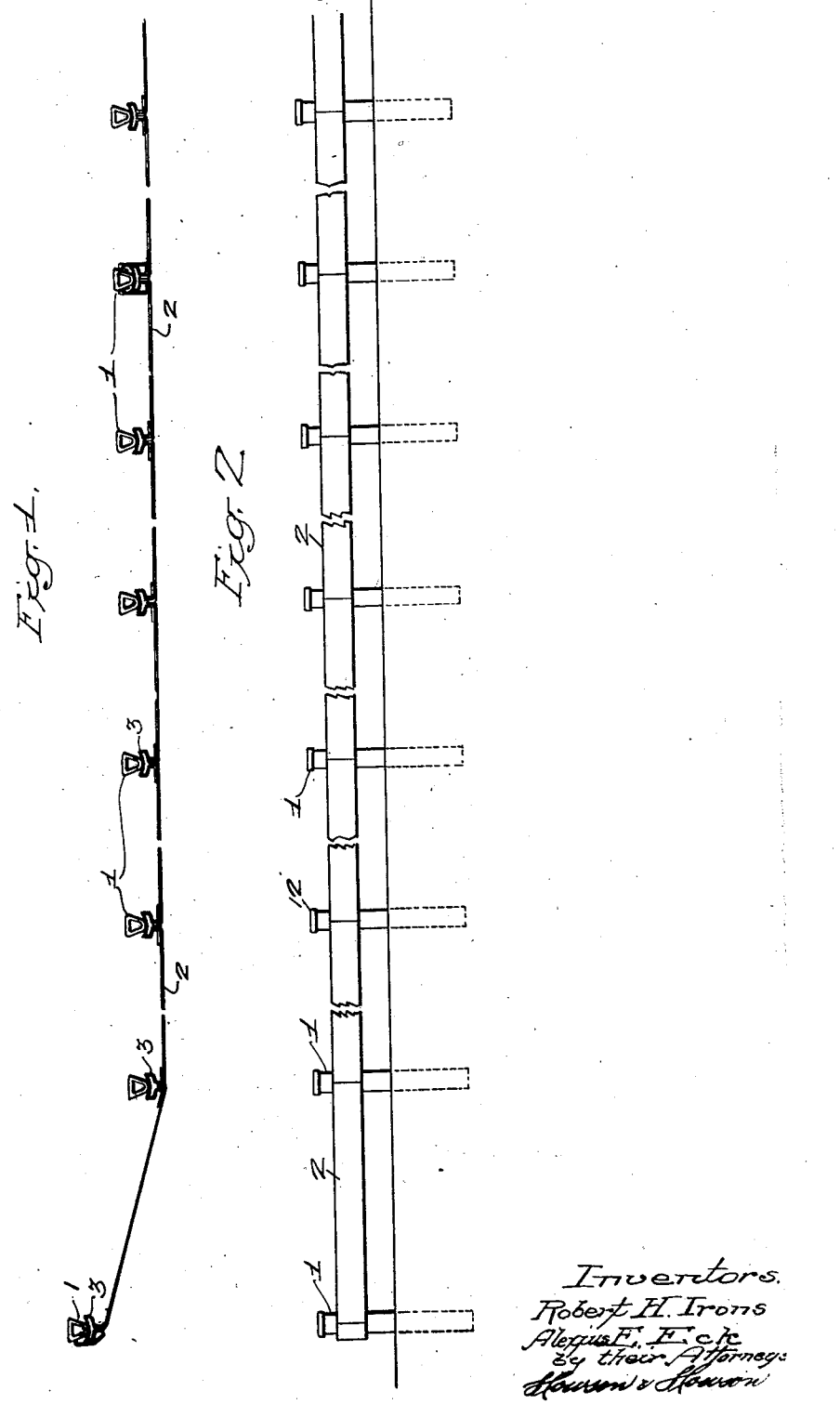

Aug. 14, 1934.  R. H. IRONS ET AL  1,969,885
HIGHWAY GUARD
Filed July 1, 1933   6 Sheets-Sheet 2

Inventors
Robert H. Irons
Alexius E. Eck
by their Attorneys

Aug. 14, 1934.  R. H. IRONS ET AL  1,969,885
HIGHWAY GUARD
Filed July 1, 1933   6 Sheets-Sheet 3

Inventors
Robert H. Irons
Alexius E. Eck
by their Attorneys
Howson & Howson

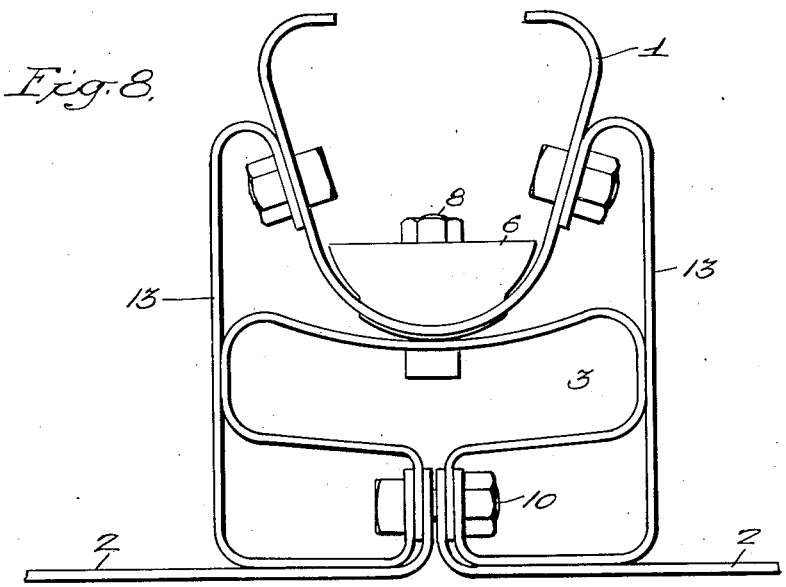
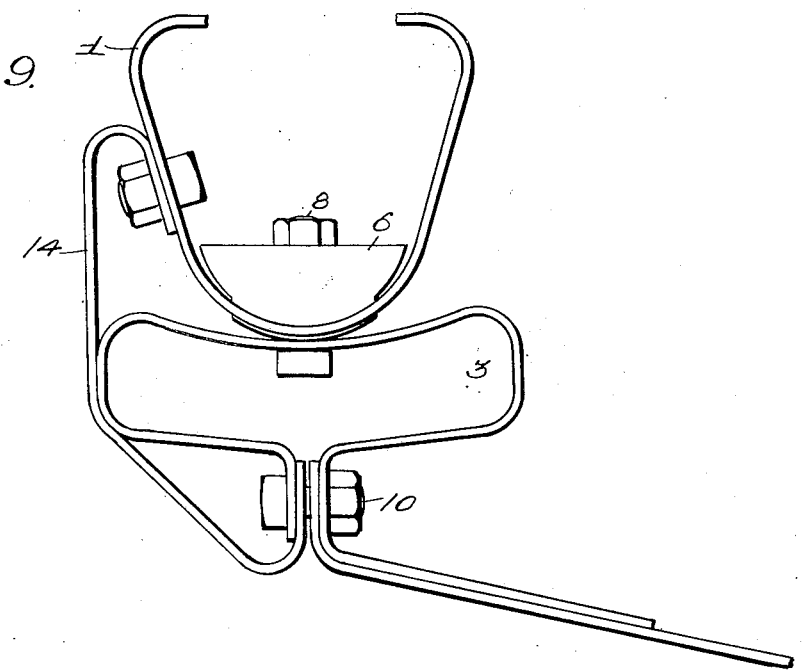

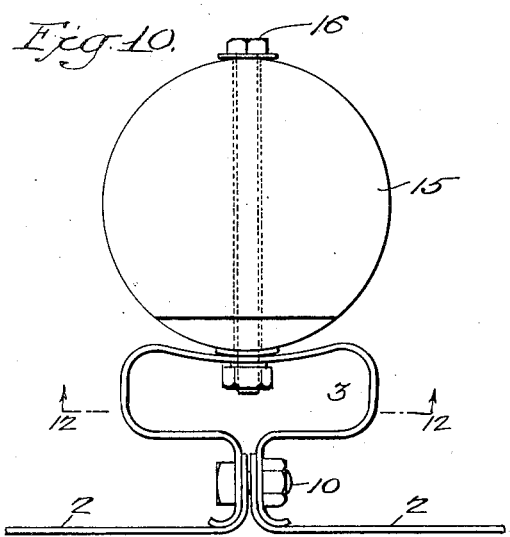
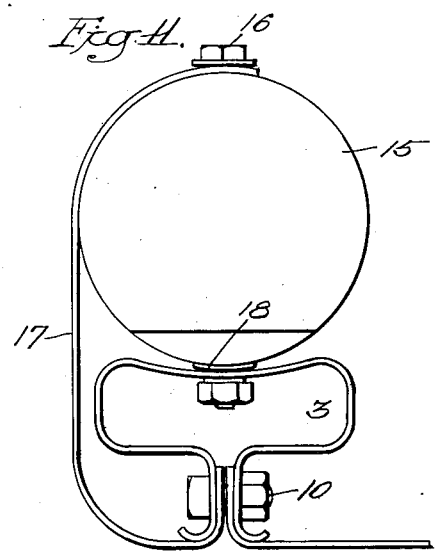
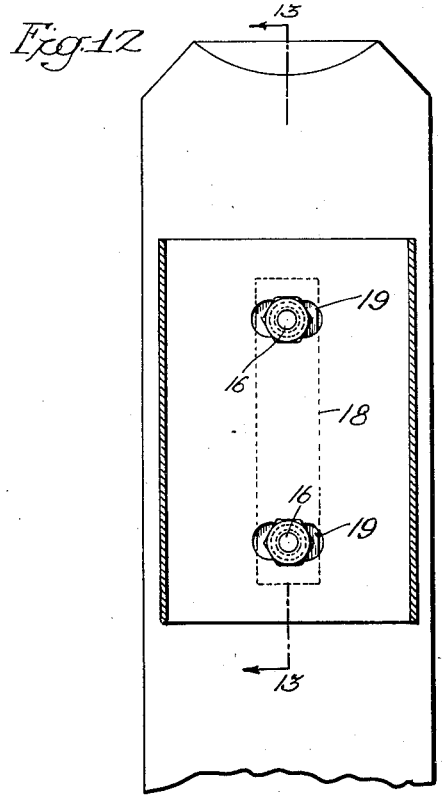
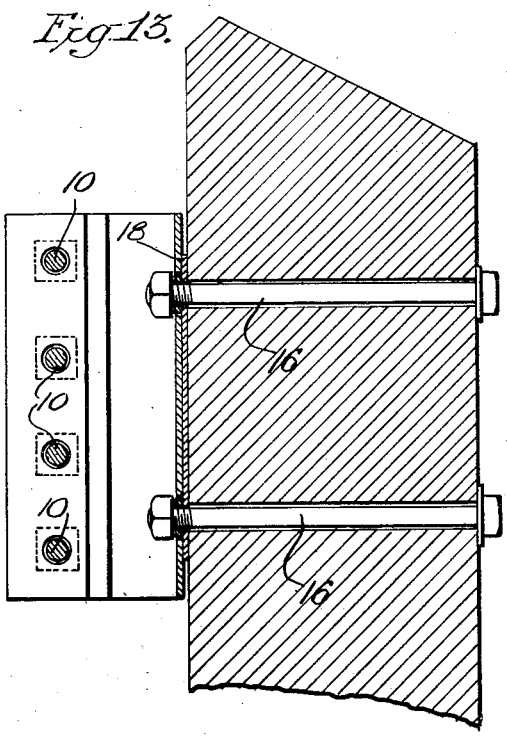

Aug. 14, 1934.  R. H. IRONS ET AL  1,969,885
HIGHWAY GUARD
Filed July 1, 1933  6 Sheets-Sheet 6

Inventors
Robert H. Irons
Alexius E. Eck
by their Attorneys
Howson & Howson

Patented Aug. 14, 1934

1,969,885

UNITED STATES PATENT OFFICE 1,969,885

HIGHWAY GUARD

Robert H. Irons, Harrisburg, and Alexius E. Eck, Camp Hill, Pa., assignors to Central Iron & Steel Company, Harrisburg, Pa., a corporation of Pennsylvania Application July 1, 1933, Serial No. 678,678

12 Claims. (Cl. 256—13.1)

This invention relates to improvements in highway guards, and the principal object of the invention is to provide a simple and highly efficient and durable guard rail construction that may be readily manufactured and erected.

More specifically, an object of the invention is to provide a novel highway guard construction adapted primarily for use of metal plates as the guard rail elements.

In the attached drawings:

Figure 1 is a plan view and Fig. 2 a front elevational view of a section of a highway guard embodying our invention;

Fig. 8 is a plan view of one of the posts and the adjoining portions of the rails illustrating a reinforcing means used to advantage on certain of the intermediate posts of the series;

Fig. 9 is a similar view showing a terminal post and the associated rail portions;

Figs. 10 and 11 are plan views of a modified form of post showing the immediately connecting portions of the rails;

Fig. 12 is a section on the line 12—12, Fig. 10;

Fig. 13 is a section on the line 13—13, Fig. 12;

Figure 14:
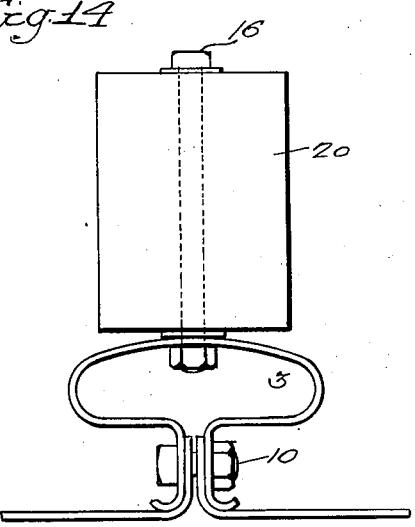
Figure 15:
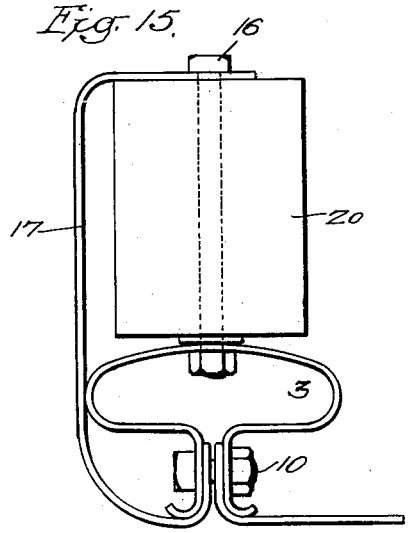
Figure 16:
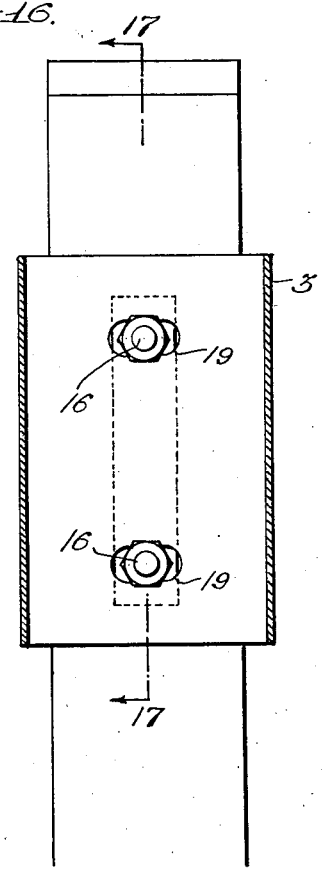
Figure 17:
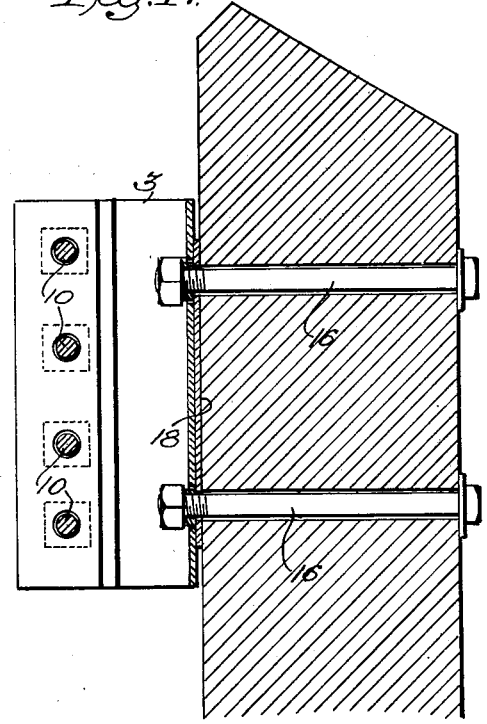

Figs. 14 and 15 are views corresponding to Figs. 10 and 11 but illustrating a still further form of post, and Figs. 16 and 17 are sectional views corresponding to those of Figs. 12 and 13 respectively and illustrating details of the structure shown in Fig. 14.

With reference to Figs. 1 and 2, a highway guard made in accordance with our invention comprises a plurality of posts 1 suitably spaced and constituting supports for a rail 2. The posts 1 are in the illustrated instance of metal, as also is the rail 2, which is made up of a number of sections of rolled metal plate secured together and to the supporting posts 1, as hereinafter set forth. Interposed between the rail 2 and each of the posts 1 is a resilient buffer element 3, which constitutes both the means for mounting the rail on the posts and also the shock-absorbing elements.

Figure 3:
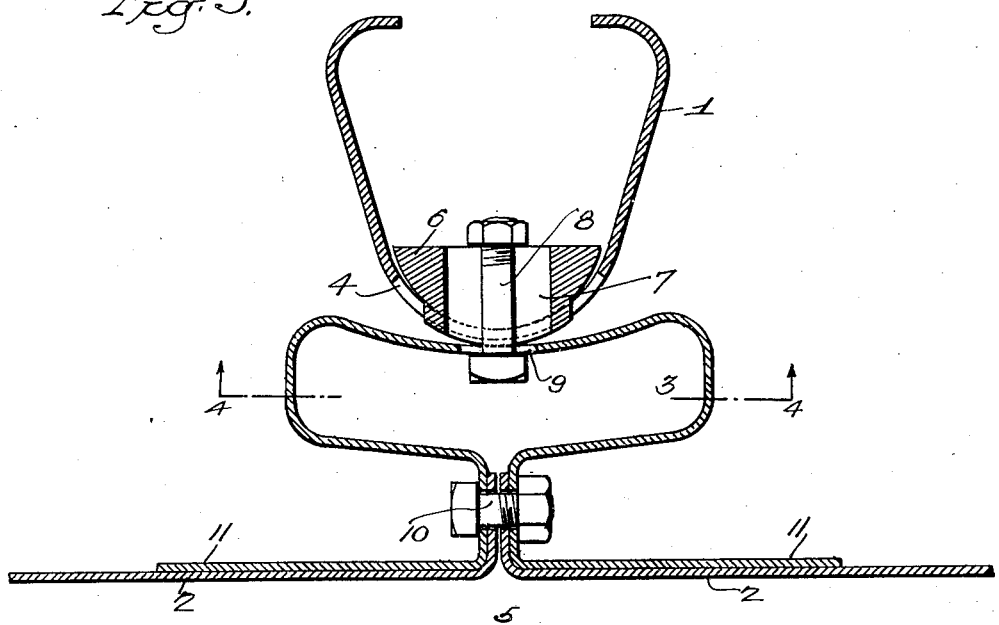
Fig. 3 is a transverse sectional view through one of the posts and the immediately adjoining rail sections.
Figure 5:
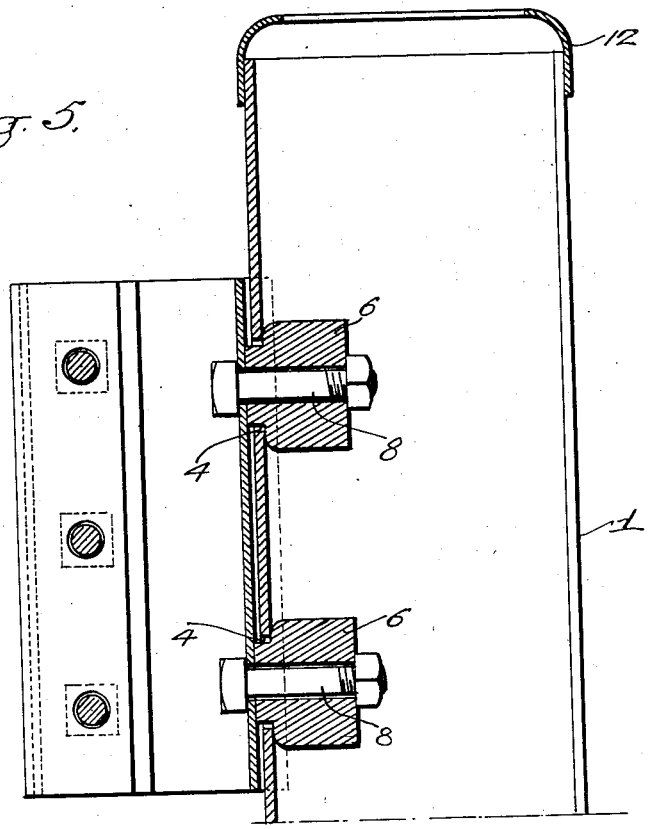
Fig. 5 is a sectional view on the line 5—5, Fig. 4.
Figure 7:
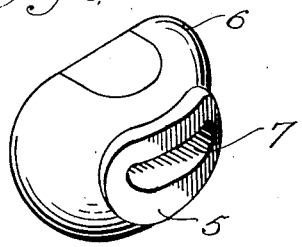
Fig. 7 is a detached perspective of one of the elements of the structure shown in the preceding figures.
Figure 6:
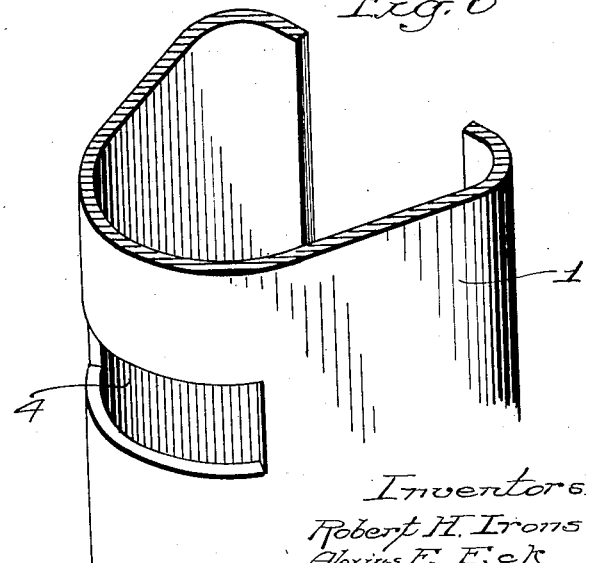
Fig. 6 is a fragmentary perspective showing a detail of a preferred post construction.

As shown in Figs. 1, 5 and 6, the posts 1 in the present instance are hollow and are divided at their rear sides, the forward faces of the posts being rounded as illustrated. Each of the posts has in its forward rounded face one or more transverse slots 4, see Figs. 5 and 6, adapted for reception of the projecting portion 5 of a swivel element 6 shown in perspective in Fig. 7, which elements are adapted in assembly to occupy positions in the interior of the posts, as best shown in Figs. 3 and 5. The forward face of the swivel elements 6 is rounded to conform more or less closely to the curvature of the forward side of the post, and the forward face of the projecting portion 5 of the said elements is also rounded on a curve corresponding substantially to that of the side of the post through which it projects. Each of the swivel elements is provided with a transverse slot extending completely through the element from the forward face of the projection 5, and these slots are adapted for reception of bolts 8 by means of which the buffer elements 3 are secured to the projecting face of the said elements.

Figure 4:
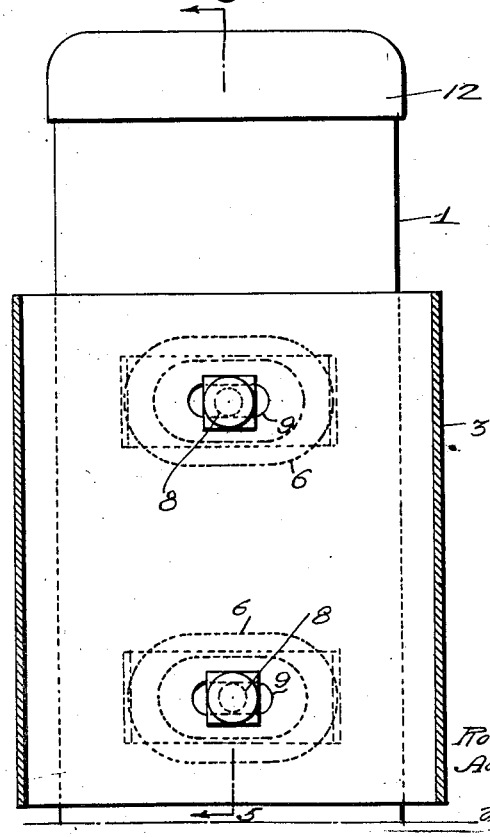
Fig. 4 is a fragmentary sectional elevation on the line 4—4, Fig. 3.

These elements 3 are preferably formed of resilient metal sheets or strips shaped in the form of a bow and provided in the bowed portion with transverse slots 9 for passage of the bolts 8, which as previously set forth secure the buffer to the swivel elements. The free ends of the buffer 3 as shown in Fig. 3 project forwardly and are secured together by means of a bolt 10, and this bolt also passes through openings in the rearwardly turned extremities of the rail plates 2 and confine the said ends of these plates between the forwardly projecting free ends of the bowed buffer 3. In the present instance, the free ends of the buffer member 3 are extended transversely, as indicated at 11 in Fig. 3, and lie against the rear faces of and reinforce the ends of the rail plates 2. The posts 1 may, as shown in Figs. 4 and 5, be provided with cap elements 12.

It will be apparent from the foregoing description that our invention not only provides an extremely rugged guard rail structure but also one having a maximum of flexibility and freedom for self-adjustment and compensating movements under any strain that may be imposed. Thus referring to Fig. 3, the swivel elements 6 have free transverse movement in the slots 4, the bolts 8 have a corresponding movement in the slots 7 of the swivel elements, while the buffer elements 3 have a still further freedom for adjustment with respect to the swivel element by reason of the slotted form of the opening 9 through which the bolt 8 extends. Thus the rail while securely supported in position against all normal strains is flexibly supported against such abnormal strains that may be imposed upon it.

We have found it desirable for reinforcing purposes to provide certain of the posts of the series at spaced intervals with the construction shown in Fig. 8. As therein illustrated, extra reinforcing tension plates 13 are clamped at one end by the bolt 10 to the rails and to the buffer element 3, and at the other end to the sides of the post 1. Intermediate their ends, the plates 13 normally engage the rear faces of the rail plates 2 and also the outer ends of the looped buffer element 3. A corresponding structure is employed on the terminal posts of the series, as shown in Fig. 9, a plate 14 similar to the plates 13 previously described being secured at one end by the bolt 10, and at the other end to the side of the post 1. This plate bears intermediate its ends against one side of the looped buffer member 3.

While we have preferred to use a metal post of the general form illustrated in the preceding figures, we may, as shown in Figs. 10 to 17, inclusive, employ posts of other types. Figs. 10 and 11 show the invention as applied to a wooden post 15 of circular cross section. A bolt 16 in this instance is passed completely through the body of the post and constitutes the securing means for the looped buffer element 3. The rail plates 2 are secured to the buffer member 3 in the manner previously set forth. At the terminal posts in this instance a reinforcing tension plate 17 similar to the plate 14 previously described is used, this reinforcing plate being secured at one end by the bolt 10 and extending rearwardly to the back of the post 15 where it is held in place by the bolts 16. Preferably a wear plate 18 is inserted between the wooden post and the buffer element 3; and provision is made in the form of transverse slots 19 for reception of the bolts 10 for affording a certain amount of movement of the buffer loops with respect to the post under exceptional strains.

Figs. 14 to 17, inclusive, illustrate the same construction as applied to rectangular wooden posts 20. The corresponding parts in these figures are given the same reference numerals as in the figures preceding.

The rail plates 2, bumper springs 3 and the steel post and cap are preferably made of open-hearth copper-bearing steel, while the swivel elements 6 may be made of cast iron. The materials, however, of which the elements of the structure are made form no essential part of the invention and may vary widely.

We claim:

1. A highway guard comprising a hollow metal post, a swivel element projecting from the interior through an opening in said post and movable transversely in the latter, a rail, and resilient means securing the rail to said swivel element.

2. A highway guard comprising a hollow metal post having a transverse slot in its forward face, an element secured in said post and adjustable in the slot, a rail, and resilient means securing the rail to said element.

3. A highway guard comprising a hollow metal post, a swivel element projecting from the interior through an opening in said post and movable transversely of the latter, a bowed spring secured intermediate its ends to the projecting end of said element, a rail, and means for securing the rail to the free ends of said spring.

4. A highway guard comprising a hollow metal post having a convexed forward surface, said surface having a transverse slot, a swivel element having a convexed surface bearing upon the inner concaved surface of said post and having a portion projecting through and slidable in said slot, a rail, and a bowed spring secured to the rail and to the projecting portion of said swivel element and constituting a buffer between said rail and the post.

5. A highway guard comprising a hollow metal post, a swivel element projecting from the interior through an opening in said post, said swivel element having a bearing upon the inner surface of said post for preventing displacement thereof through said opening, a slot in said swivel element, a bowed spring, a bolt extending through said spring and through the slot in said swivel element and securing said element and spring together, and a rail secured to said spring.

6. A highway guard comprising a hollow metal post having a curved forward face and an opening in said face, a swivel element bearing upon the inner surface of said post and having a portion projecting through said opening, the forward face of said swivel projection being curved to conform substantially to the curvature of said post, a transverse slot in said swivel element, a rail, and a bolt extending through said slot and securing the rail to the swivel element.

7. A highway guard comprising a hollow metal post having a curved forward surface and a transverse slot in said surface, a swivel element bearing against the inner face of said post and having a portion projecting and slidable in said slot, the forward face of said projection being curved to conform substantially to the curvature of said post, a rail, a bowed spring secured to the rail and interposed between said rail and the post, said swivel element having a transverse slot therethrough and the spring having a transverse opening in its rear portion, and a bolt extending through said slot and securing the spring to the swivel element.

8. A highway guard comprising a post, a rail in the form of a flat metallic plate, a bowed spring member mounted for transverse self-adjustment on the forward face of said post, and means for securing the terminal end of said rail between the free ends of said spring.

9. A highway guard comprising a post, a rail in the form of a flat metallic plate, a bowed spring member secured to the forward face of said post, means for securing the terminal end of said rail between the free ends of said spring, and a reinforcing metallic plate having one end also secured to the terminal ends of said spring and the other end extending rearwardly and secured to said post.

10. A highway guard comprising a post, a bowed spring terminating in freely projecting ends, a member mounted for transverse self-adjustment on the post, means for adjustably securing the bowed end of said spring to said member, a rail in the form of a metal sheet, and means for securing a terminal end of said rail to the freely extending ends of said spring.

11. A highway guard comprising a post, a bowed spring terminating in freely projecting ends, means for adjustably securing the bowed end of said spring to the post, a rail in the form of a metal sheet, and means for securing a terminal end of said rail to the freely extending ends of said spring, one of the free ends of said spring extending transversely and lying against the rear face of said rail.

12. A highway guard comprising a post, a bowed spring having its bowed portion secured to said post and having forwardly extending free ends, said securing means being constructed and arranged to afford limited self-adjustment of the spring transversely of the post, rails in the form of metal plates having terminal end portions rearwardly turned between the free ends of said spring, and a bolt passing through the ends of the spring and of said plates and securing said spring and plates together.

ROBERT H. IRONS.
ALEXIUS E. ECK.